US010878655B2

(12) United States Patent
Waxman

(10) Patent No.: US 10,878,655 B2
(45) Date of Patent: Dec. 29, 2020

(54) COMPUTER-IMPLEMENTED NETWORKED COMPETITIVE POKER PLAYING PLATFORM AND ASSOCIATED MATCH PLAY METHOD

(71) Applicant: Matthew A. Waxman, Fort Lauderdale, FL (US)

(72) Inventor: Matthew A. Waxman, Fort Lauderdale, FL (US)

( * ) Notice: Subject to any disclaimer, the term of this patent is extended or adjusted under 35 U.S.C. 154(b) by 262 days.

(21) Appl. No.: 15/692,420

(22) Filed: Aug. 31, 2017

(65) Prior Publication Data

US 2019/0066431 A1 Feb. 28, 2019

(51) Int. Cl.

| | |
|---|---|
| ***A63F 9/24*** | (2006.01) |
| ***A63F 13/00*** | (2014.01) |
| ***G06F 17/00*** | (2019.01) |
| ***G07F 17/32*** | (2006.01) |
| ***A63F 1/00*** | (2006.01) |
| ***A63F 3/00*** | (2006.01) |

(52) U.S. Cl.

CPC .............. *G07F 17/323* (2013.01); *A63F 1/00* (2013.01); *A63F 3/00157* (2013.01); *A63F 9/24* (2013.01); *A63F 2001/005* (2013.01); *A63F 2009/2457* (2013.01)

(58) Field of Classification Search

CPC ........................... G07F 17/329; G07F 17/3293
See application file for complete search history.

(56) References Cited

U.S. PATENT DOCUMENTS

| | | | | |
|---|---|---|---|---|
| 5,882,260 | A * | 3/1999 | Marks | G07F 17/32 273/292 |
| 7,422,521 | B2 | 9/2008 | Peterson | |
| 8,246,434 | B2 | 8/2012 | Moody | |
| 8,663,012 | B2 | 3/2014 | Weingardt | |
| 8,777,713 | B2 | 7/2014 | Filipour et al. | |
| 2003/0070178 | A1 | 4/2003 | Boyd et al. | |
| 2005/0209001 | A1 | 9/2005 | Moshal | |
| 2006/0157934 | A1* | 7/2006 | Yoseloff | A63F 1/18 273/292 |
| 2007/0173318 | A1 | 7/2007 | Abbott | |

(Continued)

OTHER PUBLICATIONS

Texas Hold'em Rules. Dec. 12, 2014, (Year: 2014). 4 Pages.*
Annual Computer Poker Competition, No-limit Games, p. 1.

*Primary Examiner* — Kang Hu
*Assistant Examiner* — Jason Pinheiro

(57) ABSTRACT

A computer-implemented platform and associated method for conducting a competitive poker-based event, for example, in the form of a league of teams each made up of individual team players, incorporates a unique and unconventional methodology of resetting competitor chip stack sizes prior to the commencement of each dealt hand, such that each player begins each new hand with an identical total chip stack unit value. Players may participate remotely via portable electronic devices. Player rankings are determined based upon a unique skill set including statistical variables such as match success rate, uncontested chips accrued, and equity quotient. Competitive matches incorporate a unique event format featuring predefined time intervals (i.e. Quarters) and a betting time clock limiting a competitor's time to act when action is on that player. Events may be broadcasted over the Internet as well as via a television network.

7 Claims, 6 Drawing Sheets

(56) References Cited

U.S. PATENT DOCUMENTS

| | | | |
|---|---|---|---|
| 2007/0184897 A1 | 8/2007 | Fujimoto | |
| 2007/0243936 A1 | 10/2007 | Binenstock et al. | |
| 2008/0108404 A1 * | 5/2008 | Iddings | G07F 17/32<br>463/16 |
| 2008/0146351 A1 | 6/2008 | Packes et al. | |
| 2013/0005421 A1 | 1/2013 | Barzilay et al. | |
| 2013/0184039 A1 | 7/2013 | Steir et al. | |

* cited by examiner

200

| | SCOREBOARD | | | |
|---|---|---|---|---|
| | PLAYER 1 | PLAYER 2 | PLAYER 3 | PLAYER 4 |
| | WIN/LOSS | WIN/LOSS | WIN/LOSS | WIN/LOSS |
| HAND 1 | 0 | +100 | -20 | -80 |
| HAND 2 | -50 | -75 | 0 | +125 |
| HAND 3 | +75 | +75 | -50 | -100 |
| HAND 4 | +100 | 0 | -50 | -50 |
| TOTAL | +125 | +100 | -120 | -105 |

202, 204, 206, 208, 210, 212, 214, 216, 218, 220, 222

FIG. 3

BLINDS: $500/$1,000
ANTE: $500

COST/ORBIT (CPO): $3,500

| | | STREETS | | | | |
|---|---|---|---|---|---|---|
| | HOLE CARDS | PRE-FLOP | FLOP | TURN | RIVER | |
| PLAYER 1 | AsAh | 80.4% | 8.59% | 4.55% | N/A | |
| | POT | 18,500 | 38,500 | 202,500 | — | |
| | WAGER | 7,500 | 10,000 | 82,000 | All-In @ Turn | |
| PLAYER2 | JdJc | 19.6% | 91.4% | 95.5% | N/A | TOTAL E.Q. |
| EQUITY QUOTIENT P1 | | +2.11 | -1.91 | -20.8 | — | -20.6 |
| EQUITY QUOTIENT P2 | | -1.11 | +7.2 | +31.8 | — | 37.9 |

6cJs4d 6d N/A

COMMUNITY CARDS

FIG. 4a

BLINDS: $1,000/$2,000 COST/ORBIT (CPO): $7,000

ANTE: $1,000

| | | STREETS | | | | |
|---|---|---|---|---|---|---|
| | HOLE CARDS | PRE-FLOP | FLOP | TURN | RIVER | |
| PLAYER 1 | Qh8h | 37.3% | 47.1% | 29.5% | 100% | |
| | POT | 15,000 | 33,000 | — | 87,000 | |
| | WAGER | 5,000 | 9,000 | — | 27,000 | |
| PLAYER2 | KcJc | 62.7% | 52.9% | 70.5% | | TOTAL E.Q. |
| EQUITY QUOTIENT P1 | | 0.085 | 0.93 | — | 8.57 | 9.59 |
| EQUITY QUOTIENT P2 | | 0.630 | 1.21 | — | -3.86 | -2.02 |

| | | | |
|---|---|---|---|
| | KhThQc | 3c | Jh |

COMMUNITY CARDS

FIG. 4b

COMPUTER-IMPLEMENTED NETWORKED COMPETITIVE POKER PLAYING PLATFORM AND ASSOCIATED MATCH PLAY METHOD

FIELD OF THE INVENTION

The present disclosure relates generally to the field of playing card based games and more particularly to the field of competitive skill-based card games playable over a computer network.

BACKGROUND OF THE INVENTION

The game of poker originated in the early nineteenth century and includes a family of card games involving betting and individualistic play whereby a winning hand is generally determined by the ranks and combinations of the players' cards, at least some of which remain hidden until the end of the game. Poker games vary in the number of cards dealt to players, the number of shared "community" cards dealt, and the number of cards that remain hidden. The betting procedures vary among different poker games in such ways as betting limits and splitting the pot between a high hand and a low hand.

The popularity of the game of poker has risen dramatically in recent years, largely as the result of television coverage, Internet websites, and an increasing emphasis on the game by casinos. Not only have casinos devoted more of their gambling space to poker but sales of poker books and participation in online poker tournaments has skyrocketed. As conventionally played, the game of poker incorporates an interesting mixture of skill and luck that attracts gamblers confident in their ability to have enough skill to conquer the element of luck.

Conventionally, poker games, such as, for example, Texas Holdem style poker, follow one of two main formats; cash games and tournament play. Cash games are played on a single table. In cash games players exchange money for chips, and there is usually a minimum and maximum buy-in amount, depending on the stakes. In tournament play, although there are exceptions, players generally buy in for the same monetary amount and are given an identical starting value of tournament chips (i.e. a starting chip stack). With regard to cash games, players have the option to quit the game at any time, and may then exchange any remaining chips for their cash value. On the other hand, tournaments end when a single player remains that has accumulated all of the tournament chips. Typically, a percentage of players (e.g. the last ten percent of players remaining in the tournament) are subsequently paid from a tournament prize pool based on their respective finishing positions in the tournament.

Elimination tournaments are often held at casinos and other card rooms around the world. As is the case with cash games, during tournaments individual players play for themselves and must "buy in" to the tournament with a personal stake. Each of the players comprising a starting tournament field is provided with a starting seat at one of a plurality of game-playing tables, with players seated at a common table competing against each other. Typically, there are multiple individual poker games running concurrently at the respective tables. A winner may be declared at each table when one remaining player at each table has won the stake of all the other players at that table. However, more commonly, as players are eliminated from tournament tables, players seated at tables that have the fewest remaining players are transferred, or moved, to open seats at other tables. A moved, or transferred, player retains his current chip winnings for use at his reassigned seat at the new table. The player's remaining accumulated chips comprise the player's available stake, or chip stack, for use against other players at the new table. A tournament champion is eventually crowned when a single player remains in the tournament, and thus holds a value of chips equal to the total initial starting stakes, or chip stacks, of all the players that entered the tournament (which may include multiple stakes of eliminated individuals that have bought in to a so-called "re-buy" format tournament). Although conventional poker tournaments, in their various formats, have gained in popularity over recent years, they share a common general format, wherein each player participates as an individual competitor, and the popularity of such conventional tournaments is one of individual popularity. The same holds true for cash games.

As the game of poker, and particularly Texas Holdem poker, has grown at an accelerated pace over the past couple of decades, there has been a proliferation of online poker websites developed, which enable individuals to compete against other website member players in both cash game and tournament style formats. In some instances, competing players may win prizes. However, such sites suffer from a number well known drawbacks and limitations. For instance, participants whom do not have a real financial stake will often play in an unrealistic manner since they are not playing with real money and, therefore, have nothing to lose. Accordingly, it is exceedingly difficult for a participant to gain an accurate sense of their relative skill level. Furthermore, as is the case with live poker gaming online poker is still restricted to an individual player format.

Even in settings where competing players do have a stake in an outcome, and thus do play in a realistic manner, there is a high degree of luck associated with conventional poker games, which has a limiting effect on the degree of accuracy of statistical information that can be derived in order to provide players with useful feedback vis-à-vis strengths and weaknesses in their game play. Obviously, any limitations relating to the accuracy of collected statistical information will have a resulting limiting effect on the ability to utilize such statistics to accurately measure the relative skill levels of competing players (e.g. in order to create accurate and realistic player skill level based rankings). While it is not possible to completely eliminate the element of luck since there are always luck-related variables that will come in to play, it would be beneficial to provide a poker-based competitive event that reduces the effect of luck on the outcome of such a competitive event.

Within the general poker playing population, from top professionals to novices, access to a poker platform wherein participating players are assigned a relative skill-based player ranking providing players with a more accurate, quantitative-based assessment of their poker skill level would be very well received, particularly where such a platform effectively minimized variables, such as the element of luck associated with the conventional dealing of playing cards, which are known to skew the accuracy of player skill level measurements (and associated player rankings) based on conventional variables such as player tournament winnings, average tournament finishing positions, and the like. Additionally, the game of poker has been player primarily according to the same conventional rules and respective poker game format for years. Providing a novel version of the game that would require participating players to utilize a different skill set would likely be welcomed by most of the poker playing community. Accordingly, it would be highly desirable to provide a competitive poker event platform supporting a poker playing format requiring a unique poker skill set, in which individuals could compete against one another while reducing conventional biases, such as the element of luck, from the equation during any given hand. This would lend itself to a significantly more accurate determination of the relative skill levels of competing players under the new format. Furthermore, it would be highly desirable to provide such an event platform and corresponding method of play requiring a unique skill set compared with conventionally known methods of play. It would be even more beneficial if at least some of the knowledge gained by players learning the novel skill set could be translated for use when playing conventional poker games; thus, also improving the overall poker skill level of participants.

It would be highly desirable to provide such a platform highly adaptable for supporting a competitive poker event, such as a poker league made up of multiplayer teams, wherein the platform supports and facilitates a game structure in which individual players from each of a plurality of competing teams are exposed to a series of identical game situations and subsequently ranked, at least in part, based upon statistical variables substantially correlating to the respective skill level with which each player has played a common series of hands, in accordance with the corresponding unique skill set required. Preferably, the unique poker event platform and methodology would be easily adaptable to the formation of a worldwide (or other geographically-based) competitive poker league based upon the unique competitive poker playing platform, which would have more of a sporting event type atmosphere than a typical card game atmosphere. Such a sporting event type environment would lend itself to being broadcast for viewing by a poker enthusiast fan base. Furthermore, a poker league based upon such a unique competitive poker playing platform and associated methodology would result in an individual and team ranking heavily focused on player skill by eliminating much, if not all, of the luck (and other biasing variables) inherent in conventional poker play.

With regard to both poker games played by individuals at an actual physical location—such as a casino card room—and online poker games, the present applicant, a professional poker player in his own right, is completely unaware of any successfully deployed network platform supporting a league- or team-style event format. Again, such a format would create more of a conventional sporting event type atmosphere, not unlike football, baseball, basketball, soccer and other team-based sporting formats that have proven to be immensely popular spectator sports around the world. Such a format would lend itself to being broadcasted online via the Internet, broadcasted over television networks, or broadcasted via any other available medium for viewing by the tens of millions of poker enthusiasts around the world who could root for their favorite team, particularly where such a league has a geographic-based format. Such a competitive poker event supporting platform would be welcomed with open arms by the poker-playing community. The incorporation of a unique skill set by participants would likely add a unique wrinkle that would be a breath of fresh air to players whom have played according to the same conventional rules and formats for years.

Accordingly, it would be beneficial to provide a computer-implemented network-based poker platform uniquely configured to support remote participation by poker enthusiasts from around the world, through an online website portal, whereby the unique poker platform along with a corresponding unconventional style of play would not require participants to risk actual money, yet wherein the electronic platform configuration and associated method of play are uniquely geared for communicating highly-accurate skill level information to individual participants vis-à-vis other member participants. It would be beneficial to participating players to have access to statistically-based feedback, based upon highly accurate quantifiable information, enabling them to pin point elements of their play that could be improved in order to raise their respective skill level and corresponding player ranking.

In that regard, individual participating competitors could be provided with dynamic feedback of their play via continuously updated information displayed upon each participant's electronic device; wherein, the competitive poker supporting platform is adapted to enable participation via a conventional desktop computer workstation, a portable electronic smart device, or any other electronic device adapted for networking and communicating bi-directionally with a central system computer server via the internet.

Again, it is noteworthy that there is no such league style event format in the form of a poker competition-supporting organizational platform incorporating a methodology significantly minimizing the element of luck and related variables that are an integral part of conventional poker game play, thereby supporting a vastly improved means for comparing skill levels of participating players in a highly-accurate manner. In other words, it would be highly beneficial to provide a methodology, and supporting platform, requiring a specific unique skill set vis-à-vis the skill set associated with conventional poker related games.

It would be highly desirable to provide a computer-implemented, network-based poker platform particularly configured to facilitate the implementation of such a unique competitive poker format conducive to supporting a more unconventional structure than typical competitive tournament style play. Such a poker platform would enable and facilitate the growth and proliferation of a completely new poker methodology that does not require participants to invest any monies. While cash and non-cash prizes could still be awarded to winning teams—not unlike conventional sports such as, for example, baseball, basketball and football—it would be a tremendous benefit for such a platform to likewise enable poker players of all skill levels to continuously acquire highly accurate and useful feedback while competing with similar caliber players.

Preferably, such a platform would incorporate a software application component downloadable upon a user's workstation or portable smart electronic device, enabling players of any skill level to join/sign up through an online portal and proceed to compete against other users. Preferably, participating competitors would have the ability to immediately participate at any desired time and for any desired duration of time from a remote location via interaction through any electronic device having Internet access and having an adequate viewing display. It would be beneficial for such a website-based platform to be configured for enabling members to participate from either an actual physical poker venue (which could optionally be broadcasted online or via television) or from a remote location via a user workstation or portable electronic device.

As opposed to simply developing a team-based league format continuing to rely upon the same old conventional playing rules that have formed the backbone of existing tournament poker play, it would be highly desirable to incorporate a unique computer-implemented format based upon a unique competitive poker even platform rewarding more highly skilled players by reducing, and preferably eliminating, the ever present element of luck. Furthermore, it would be highly beneficial for such a competitive poker event supporting platform to integrate a means for carefully tracking, for each participating competitor, a series of pertinent statistical categories that skilled poker professionals, as well as non-professional poker players of all skill levels, would recognize as highly significant factors in determining relative skill level among respective participating competitors of the novel playing format. Preferably, such tracked statistics would be maintained dynamically, and could be continuously communicated in real time to individual participants. An additional benefit of recording such statistical information and making it accessible to participants is that it would enable participants to better analyze strengths and weaknesses in their poker play by removing the aforementioned variables that inherently bias current analyses using conventional methods.

The present invention provides such a unique poker competition platform associated methods of play that address all of the aforementioned limitations associated with conventional poker play, by providing a computer-implemented networked competitive computer playing platform and associated method of play incorporating a highly unique poker playing skill set required to be successful, based primarily upon a unique "stack size resetting" concept. In addition to being configured for play by individual participants across a computer network, such as the internet, the game format is likewise conducive to being played amongst individual players strictly within a physical environment. Furthermore, the present invention is adapted to be broadcasted regardless of whether the playing environment incorporates play over a network or strictly played within a physical environment.

BRIEF DESCRIPTION OF THE DRAWINGS

The invention will now be described, by way of example, with reference to the accompanying drawings, where like numerals denote like elements and in which:

FIG. 3 presents a representative exemplary implementation of a visible score board displaying player scoring for a single orbit of play;

FIG. 4*a* presents, in table format, data collected, stored and used to determine a variable Equity Quotient during the progression of dealt streets of a first played out hand between two players;

FIG. 4*b* presents, in table format, data collected, stored and used to determine a variable Equity Quotient during the progression of dealt streets of a second played out hand between two players.

Like reference numerals refer to like parts throughout the various views of the drawings.

SUMMARY OF THE INVENTION

Figure 1:
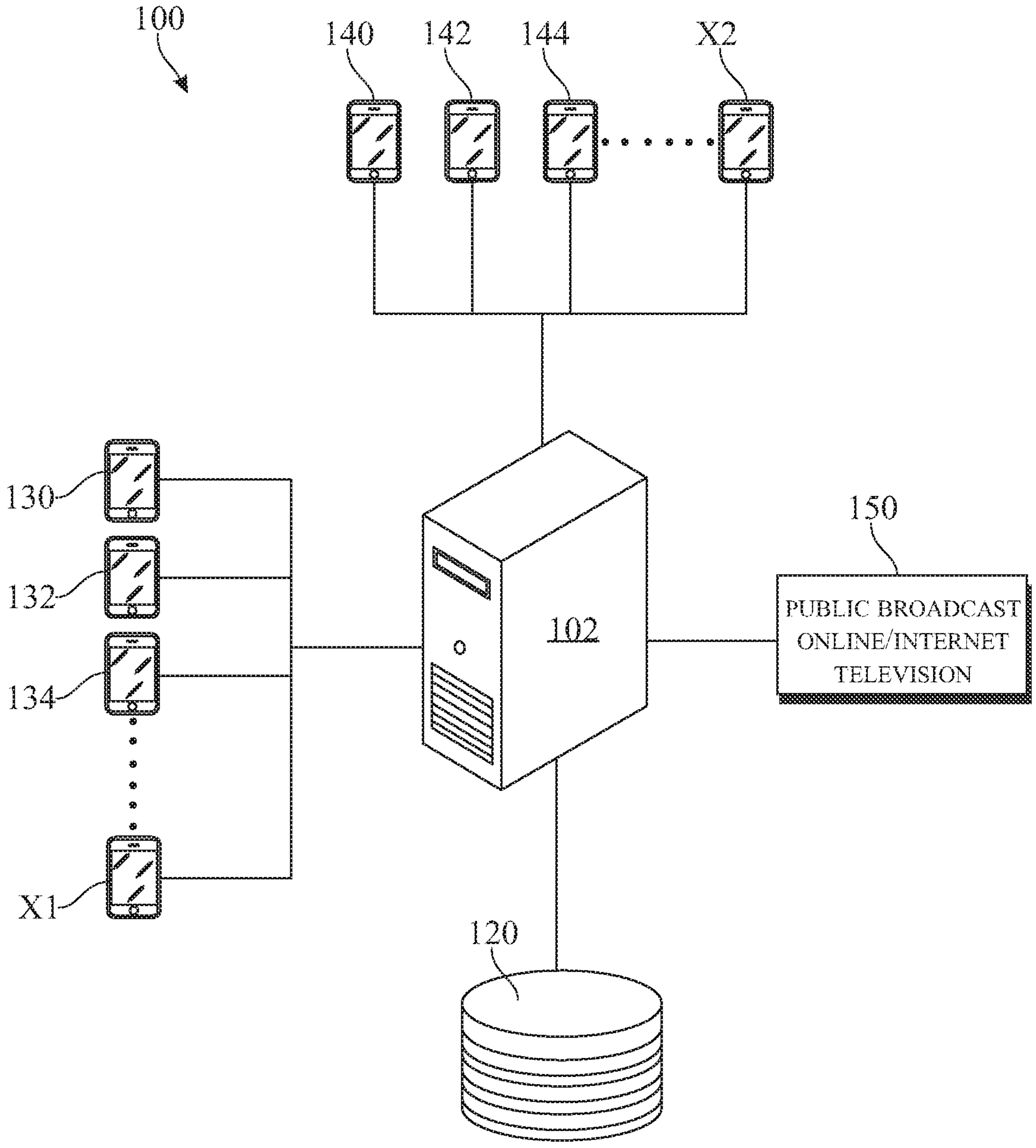
FIG. 1 presents an exemplary computer system that may be used in implementing an exemplary implementation of the invention.

The present invention is generally directed to a computer-implemented method for conducting a poker-based competitive card event amongst a plurality of individual participating players, wherein the method incorporates a unique step of resetting the participating players' chip stack sizes, or chip stack unit values, such that all of the participating players' chip stacks are reset to an equal value following the completion of play of each dealt hand and, in any event, prior to the commencement of a subsequent dealt hand.

In one exemplary implementation, the participating players are arranged about a virtual card event playing table, and the method may include steps of: (a) providing a central computer system network communicative with the internet and including a central system computer server having a processor running a poker competition instruction set, and a database; (b) providing a plurality of individual participating players each having access to an electronic device in bi-directional communication with the central system computer server, each participating player electronic device having a poker competition mobile software application running thereon, a visual display, and a participating player user interface; (c) creating, via the instruction set, a virtual poker table having the plurality of participating players assigned thereto, wherein each player is seated at a predetermined position at the virtual table, and wherein each player receives a visual depiction of the table thereon; (d) assigning an identical chip stack value to each of said participating players prior to commencement of an initial dealt hand of said event, and subsequently displaying a visual depiction of each individual participating player's starting chip stack value upon the corresponding display of each participating player's respective electronic device; (e) effecting the randomized shuffling of a virtual deck of playing cards via the computer server processor to alter an order of the playing cards from an initial pre-shuffled playing card order to a randomized post-shuffled playing card order, establishing an initial dealer button position amongst the participating players wherein an individual one of the players seated at the dealer button position is deemed the dealer position, defining a position of a player seated one position to the left of the dealer position as the big blind position, and defining a player seated two positions to the left of the dealer position as the small blind position, and establishing an ante chip unit value, a big blind chip unit value and a small blind chip unit value; (f) transmitting a portion of each player's starting chip stack equal to the ante chip value to a virtual common game pot displayed upon each player's electronic device, transmitting an additional portion of the chip stack of the player seated in the big blind position to the virtual common game pot equal to the big blind chip unit value, and transmitting an additional portion of the chip stack of the player seated in the small blind position to the virtual common game pot equal to the small blind chip unit value; (g) commencing the dealing of an initial playing card hand from the post-shuffled virtual playing card deck from the dealer position in a counterclockwise direction until each of the participating players has received one or more hole cards only viewable upon that player's electronic device display; (i) effecting an initial round of betting by the players; (j) effecting the dealing of at least one exposed community card viewable by each participating player upon his respective electronic device display; (k) effecting a second round of betting amongst at least two players remaining in the hand; (l) repeating steps (j) and (k) until a winner of the hand is declared; (m) determining, for each participating player, a change in the unit value of chips during the play of the hand; (n) recording the change in unit value of chips for each participating player and storing the recorded information in the computer database; (o) resetting, via the instruction set of the processor, each player's total unit value of chips such that each player has an equal chip stack total value prior to dealing a new hand; and (p) repeating steps (e) through (o) until each participating player has played a hand from the dealer button position (i.e. upon completion of a single orbit of play).

In another aspect, the method may include an additional step (q) of adding via the processor, for each participating player, a total change in the unit value of chips over the course of the dealt hands, recording the total change in chip unit value within the database, and determining via the instruction set of the processor a relative ranking order of the participating players based upon each player's respective total change in chip unit value, and assigning a point value to the players based upon the determined relative ranking order following completion of each orbit of play.

In another aspect, the method may include an additional step (r) of repeating steps (e) through (p) until completion of a predetermined quantity of games comprising the event.

In another aspect, the method may include an additional step (s) of determining, for each participating player, a player Experience value, a Match Success Rate value, an Uncontested Chips Accrued value, and a Total Equity Quotient value, wherein the player Experience value is based upon that player's total match experience (e.g. measured as quantity of matches played); Match Success Rate value may include a quantifiable measure of the average finishing ranking of the participating player at the completion of the event based upon the sum of the point values assigned to the respective players following completion of each orbit of play, the Uncontested Chips Accrued value may include an average units of chips accumulated or lost by the participating player during hands won without being contested by any other participating players, and the Total Equity Quotient value may include an average equity that the participating player has gained or lost, in units of chips, per each bet made by the participating player over the course of the event.

In another aspect, the method may further include a step of determining, via the instruction set of the processor, an overall ranking of each of the participating players based upon the determination of factors such as the player's Experience value, Match Success Rate value, Uncontested Chips Accrued value, and Total Equity Quotient value.

In another aspect, the method may further include a step (n) of creating a visual depiction of a virtual scoreboard via the instruction set of the processor, visible upon at least the participating player electronic device displays, for maintaining and displaying, for each participating player, the recorded change in unit value of chips for the current hand and a determined current total recorded change in unit value of chips during the course of that particular orbit of play. Furthermore, the step may include electronically transmitting to the participating player virtual scoreboards displaying both the recorded change in unit value of chips for each participating player following the completion of each dealt hand and the determined total recorded change in unit value of chips during the orbit of play.

In another aspect, the event may be broadcasted over a television network and/or over a computer network.

In another exemplary implementation, a computer-implemented method is provided for conducting a continuously running competitive poker league wherein multiple teams of poker players compete against one another and are assigned continuously updated team rankings based primarily on statistical variables that directly correlate to skill level of play, as opposed to accumulation of chips. Again, a highly significant aspect of this exemplary method is the incorporation of a player chip stack resizing step in which each player's chip stack size is reset to an equal level (i.e. value) at the completion of play of each dealt hand and, in any event, prior to the commencement of a subsequently dealt hand.

The method may include steps of: (a) providing a central computer system network communicative with the internet and including a central system computer server having a processor running a competitive poker event instruction set, and a database; (b) providing a plurality of individual participating players organized into subsets of teams having an equal number of team players, each participating team player having an electronic device in bi-directional communication with the central system computer server, each participating team player electronic device having poker competition mobile software application running thereon, a visual display, and a participating player user interface; (c) wherein the instruction set creates a plurality of virtual poker tables equal to the number of players on each team, each virtual poker table having assigned thereto a single individual participating player from each of the teams, wherein each player from each team is seated at a different starting position at the player's respective table, and wherein each player receives a visual depiction of his particular table upon the respective player's electronic device; (d) assigning an identical chip stack value to each of the participating players prior to commencement of an initial game of said poker competition, and subsequently displaying a visual depiction of each individual participating player's starting chip stack value upon the corresponding display of each participating player's respective electronic device; (e) effecting the randomized shuffle of a virtual deck of playing cards via the processor to alter an order of the playing cards from an initial pre-shuffled playing card order to a randomized post-shuffled playing card order; (f) effecting the virtual dealing of an initial set of player hole cards to each participating player from each team, such that each of a series of subsets of players, made up of one player from each respective team, seated at an identical seat position at a respective one of the virtual tables is dealt identical hole cards, and wherein each player is only able to view the face of the hole cards he has been dealt, with the hole cards of other team players at his virtual table displayed in a face-down position such that the value of the other players hole cards at a player's table are only viewable upon the respective players' devices; (g) assigning a starting dealer position at each of the virtual tables such that the starting dealer position is identical at each of the tables; (h) initiating a first round of pre-flop betting, with each player at each respective table communicating an action from his respective electronic device to the central computer system network via interaction with a respective electronic device user interface, where each player action is visually depicted in real time upon the corresponding display of each player's electronic device, and the action consist of folding, checking, calling, betting, or raising; (i) calculating, for each participating player at each table, a numerical equity quotient value quantifying an average equity that a player has gained or lost during the first round of pre-flop betting, and storing the numerical equity quotient values in the central system computer network database; (j) dealing a flop comprising an initial set of community cards, wherein the individual playing cards of the flop are communicated to each participating player's electronic device and displayed upon each player's corresponding displayed virtual table in an exposed face-up orientation; (k) initiating a second round of post-flop betting, with each player at each respective table communicating an action from his respective electronic device to the central computer system network via interaction with a respective electronic device user interface, where each player action is visually depicted in real time upon the corresponding display of each player's electronic device, and the action is chosen from the group consisting of checking, calling, betting, and raising; (l) calculating, for each participating player at each table, a numerical equity quotient value quantifying an average equity that a player has gained or lost during the first round of pre-flop betting, and storing the numerical equity quotient values in the central system computer network database; (m) dealing at least one additional post-flop community playing card, wherein the at least one additional post-flop dealt community playing card is communicated to each participating player's electronic device and displayed upon each player's corresponding displayed virtual table in an exposed face-up orientation; (n) initiating an additional round of betting following the dealing of each of the additional post-flop dealt community playing cards, with each player at each respective table still remaining active in a current game communicating an action from his respective electronic device to the central computer system network via interaction with a respective electronic device user interface, where each player action is visually depicted in substantially real time upon the corresponding display of each player's electronic device, and the player action is chosen from the group consisting of checking, calling, betting, and raising; (o) calculating, for each participating player at each table, a numerical quotient value quantifying an average equity that a player has gained or lost during each additional round of betting, and storing the numerical equity quotient values in the central system computer network database; (p) concurrently playing out the dealt hand, or game, at each of the tables to a resolution wherein at least one of the players seated at each table is identified as a winner or co-winner of the hand; (q) determining, for each participating player at each table, a final chip stack value at the conclusion of each dealt hand, communicating the final chip stack value for each player to the database, calculating each player's change in chip stack value and storing each player's change in chip stack value within the database; (r) resetting each participating player's chips stack value such that each player has an equal total chip stack value; (s) establishing a new dealer position at each of the tables, wherein the new dealer position is located by rotating the dealer position in a counterclockwise direction one player position; and (t) repeating steps (h) through (s) until each player at each table has played from the dealer position.

Detailed Description of Exemplary Implementations

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific formats, layouts and other physical characteristics, relating to the embodiments disclosed herein are not to be considered as limiting, unless the claims expressly state otherwise.

Figure 2:
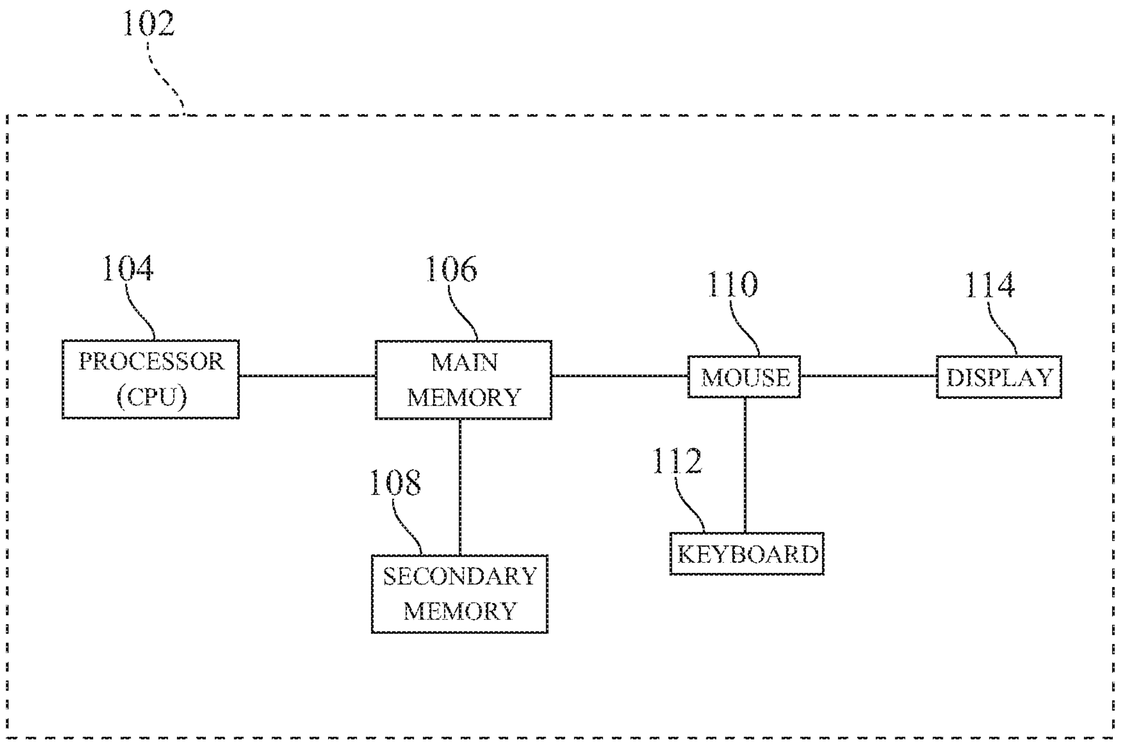
FIG. 2 presents an exemplary block diagram showing subcomponents and accessories associated with central system server 102.

Referring now particularly to FIG. 1, an exemplary computer network system that may support implementation of the methods of present invention is shown. Specifically, FIG. 1 depicts a computer system 100 that may be used in computing devices such as, for example, a client device or a server device. The present invention (or any parts or functions thereof) may be implemented using hardware, software, firmware, or a combination thereof and may be implemented in one or more computer systems or other processing systems. In fact, in one exemplary implementation, the invention may be directed toward one or more computer systems capable of carrying out the functionality described herein. An example of a computer system 100 is shown in FIGS. 1 and 2, where FIG. 2 is a block diagram of an exemplary computer system useful for implementing the present invention. Specifically, FIGS. 1 and 2 illustrate an example computer 100, which in an exemplary embodiment may be, for example, but not limited to, a personal computer or computer server running an operating system such as MICROSOFT® WINDOWS®, NT/98/2000/XP/CB/ME/ etc. available from Microsoft Corporation of Redmond, Wash., U.S.A. However, the invention may not be limited to these operating systems. Instead, the invention may be implemented on any appropriate computer system running any appropriate operating system. In one exemplary embodiment, the invention may be implemented on a computer system operating as discussed herein. Other components of the invention, such as, for example, a computing device, a communication device, a telephone, a personal digital assistant (PDA), a personal computer (PC), a handheld PC, an interactive television, client workstations, proxy servers, network communication servers, remote access devices, client computers, server computers, routers, web servers, data, media, audio, video, telephony or streaming technology servers, etc. may be implemented using a computer as shown in FIG. 1.

Generally, the computer system 100 may be organized about a central system computer/server 102. Central system computer/server 102 may include one or more processors, such as, but not limited to, central processor units (CPUs) 104. The processor(s) 104 may be connected to a communication infrastructure (e.g., but not limited to, a communication bus, cross-over bar, or network, etc). Various exemplary software embodiments may be described in terms of this exemplary computer system. After reading this description, it may become apparent to a person skilled in the relevant art(s) how to implement the invention using alternative computer systems and/or architectures.

In accordance with an exemplary implementation, a poker competition may organize many users, or participants, into a league- and or team-based competitive event. According to an exemplary embodiment, the poker platform based event may be an interactive application accessible by a user from, for example, but not limited to, a computing device, a personal computer, a workstation, a laptop, notebook, tablet and portable smart device, to name just a few.

Preferably, the computer system 100 defines a platform enabling the calculation and subsequent recording of a number of variables to be used in determining a player ranking hierarchy. Significantly, through much experimentation, the present applicant, a professional poker player, has determined four particular variables that have proven highly relevant in determining the relative playing skill levels of participating competitors. As will be apparent to one skilled in the relevant art, the individual variables used to determine relative skill level, and how each of those variables is weighted, may be modified without departing from spirit and scope of the present invention. For example, one exemplary preferred implementation of the method of the present invention specifically utilizes the following four variables:

Experience:

As used herein, "experience" is a quantifiable representation of an individual player's degree of exposure to the competitive event format, and may be quantified by measuring the quantity of event matches played.

Match Success Rate:

Match Success Rate is a quantifiable measure the average points accumulated by a player per match. For example, the quantity of points accumulated per match may be dictated by the player's relative finishing position in each match. For instance, the following is just one example of a distribution of points based upon a finishing position:

$1^{st}$ Place=4 points $2^{nd}$ Place=2 points $3^{rd}$ Place=1 point $4^{th}$ Place=0 points Uncontested Chips Accrued (UCA):

Uncontested Chips Accrued is the average amount (or units) of chips accumulated or lost by a player during hands without showdown, calculated as the sum of accumulated chips minus lost chips, divided by the total number of hands played without showdown.

Equity Quotient (E.Q.):

Equity Quotient is a crucial significant unique statistical category discovered by applicant, which provides a significant contribution to the accuracy of quantifying a player's level of skill during play vis-à-vis competing participating players. Equity quotient may be defined as the average equity that a player is profiting or losing (e.g. in units of chips) per each of that player's bets. Mathematically, "Equity Quotient" (E.Q.) may be defined by the following equation:

$$\text{Equity Quotient} = \frac{[(\text{Current Hand Equity}) - (\text{Current Wager}/\text{Total Pot})] \times \text{Total Pot}}{\text{Cost Per Orbit } (CPO)}$$

To derive an Equity Quotient for a single hand played to completion, the equity quotient totals from each street played out during the hand (i.e. Pre-Flop; Post-Flop; Turn; and River) are added together. To derive at an overall, or current, Equity Quotient an average of the recorded equity quotients for each of a series of recorded hands is calculated by dividing the sum of the recorded equity quotients by the quantity of recorded hands.

Each hand will either add to a player's Equity Quotient (EQ) or Uncontested Chips Accrued (UCA), but never for both since EQ only considers hands played to showdown, while UCA only considers hands not played to showdown. As used herein, the term "showdown" refers to a situation that occurs when the table has completed all betting and two or more players remain. With regard to Equity Quotient, four different products will be added per hand (i.e. pre-flop, flop, turn and river), where "rivers" will be 100%, 0% or 50% in the case of a tie.

The definitions of variables used in the above Equity Quotient equation are as follows:

Current Hand Equity=A percentage (%) of a current pot that is deemed to "belong to" a player based upon that player's cards. In other words, current hand equity is based upon likelihood of success (i.e. winning the hand). For example, if a player is determined to have a 50% chance of winning a pot, and the value of the pot is 1000 units, then that player's current hand equity may be defined as either 50% or as 500 units (i.e. 50% of 1,000 units).

Current Wager=A quantity of units waged in the form of a bet made or a bet called.

Total Pot Size=A total quantity of chip units of a pot, prior to a player making the current wager.

Cost per Orbit (CPO)=A player cost per orbit is defined as the sum of a player's contributed blinds plus antes for each orbit of the button at a level of play, where one orbit is deemed completed each time every player at a table has assumed the position of Dealer (i.e. the button) one time. For instance, in the case of a four-handed game, each orbit comprises four individual hands played out to completion. In the case of a four-handed game, the player cost per orbit is equal to the total units of chips contributed to the corresponding pots in the form of one big blind, one small blind and four antes (i.e. small blind+big blind+all four player antes).

It is true that the positive/negative (+/−) sign of the Equity Quotient is adjusted based upon the number of players in the pot because a player will have more reasons to call since there will be more money in the pot. With that said, there are many other factors that require consideration when determining whether or not to make a call. For instance, pot size is a highly relevant variable that must be factored into a determination of whether or not making a call is statistically proper. For example, for two players a percentage greater than 0.5 would positively weighted, for three players a percentage greater than 0.33 would be positively weighted, and for four players a percentage greater than 0.25 would be positively weighted. However, if, for instance, a player's hand in this circumstance has a 20% change of winning but a call will only cost the player 10% of the pot, then it may still be a proper move to make a call. That is, two players may both be making "profitable" decisions. The sign (+/−) of EQ is affected based upon the players in the pot. In other words, disregarding total pot size it would be guaranteed that a player's decision is a good one with a percentage greater than 50% (or 0.5); however it is still possible to make a profitable decision even where the EQ is less than 50% if we account for the total size of a pot—or other factors/variables that tend to support a call.

A Statistical Library is maintained for each user on the central system computer server (102). In addition to the aforementioned exemplary variables considered for determining a player's relative ranking (i.e. EquityQuotient; Uncontested Chips Accrued; Match Success Rate; and Experience), each user statistical library maintains additional statistics that may not be considered in determining player ranking. However these additional statistical categories do provide specific information useful for a player as a reflection of the individual's play compared to other players. The statistical library may be modified over time, for example, to add new statistical categories useful to players. In accordance with an exemplary implementation, such additional statistical categories may include the following:

Hand Win Rate:

Hand Win Rate is defined as the percentage of hands won by a player, calculated as the total number of hands won divided by the total number of hands dealt.

Uncontested Pots:

Uncontested Pots is defined as the percentage of total dealt hands that were won by a player without showdown, and is calculated as the total number of hands won by a player without showdown divided by the total number of hands the player has been dealt.

Chip Win Rate:

Chip Win Rate is defined as the average increase of decrease in chip units per dealt hand of a player, calculated as the total units of chips won (or lost) by a player divided by the total number of hands dealt.

Activity Rating:

Five different tracked statistics contribute to determining a player's Activity Rating, including:

(1) Voluntary Action: The percentage of hands a player does not open fold with their first decision (note: checking as the big blind is excluded from this calculation).

(2) Flops: The percentage of flops where a player has hole cards.

(3) Turns: The percentage of turns where a player has hole cards.

(4) Rivers: The percentage of rivers where a player has hold cards.

(5) Showdown Presence: The percentage of showdowns where a player has hole cards. That is, the number of times that a player reaches that particular street of action without mucking their hand (i.e. the player has not folded their hand).

Aggression Rating:

Aggression Rating is defined as the percentage of times a player makes the last/final bet or raise per street of action. The aggression rating may be affected one or more times over the course of a single hand; it is calculated at the conclusion of each betting round (i.e. as opposed to the end of each hand).

Showdown Success Rate:

Showdown Success Rate is defined the percentage of times that a player wins when going to showdown, calculated as the total number of showdowns won by a player divided by the total number of showdowns in which a player participates.

In accordance with an aspect of the present invention, an identical unique match format structure will preferably be implemented for both online participating clients/customers and professional poker league broadcasts. It is important to note that while this particular match format is preferred, the invention is not intended to be so limiting. In the preferred match format each match will include four competing players, with each match divided into four 10-minute quarters. Preferably, antes will be incrementally increased at the commencement of each successive quarter. Preferably, there will be a single 5-minute long half time per each match.

In accordance with the preferred implementation, at the commencement of a match, each player will begin with, for example, 100,000 units. The big blind, small blind and ante for each quarter is preferably as follows:

| Quarter | Small Blind | Big Blind | Ante |
|---|---|---|---|
| Q1 | 500 units | 1000 units | 500 units |
| Q2 | 500 units | 1000 units | 1000 units |
| Q3 | 500 units | 1000 units | 1500 units |
| Q4 | 500 units | 1000 units | 2000 units |

A significant feature of the methodology is the incorporation of a step of resetting player chip stack sizes prior to the commencement of each new dealt hand. Resetting stack size (alternatively referred to herein as "resetting stacks") following the completion of each hand ensures that each player begins each hand with an identical total quantity of chip units. In this manner, each player is on equal footing with regard to chip stack size at the onset of each dealt hand. As will be further elaborated below, the concept of resetting stacks is an indispensable aspect of the invention that is a complete departure from conventional cash and tournament poker play. As further described below, it creates the framework necessary to provide a match play format supporting a team-based poker league format.

Referring now particularly to FIG. 3, there is a player scoreboard, shown generally as reference numeral 200, which goes hand-in-hand with the resetting stacks aspect of the method. While each player's chip stack size is reset at the conclusion of each hand, chips won and lost by each player during each hand of play are tallied upon the dynamically updated scoreboard 200. Accordingly, the sum the competing player scores for any particular hand will always equal zero. The scoreboard 200 is continuously updated and made visible to each participating competing player, e.g., via a physical scoreboard for a player participating at a physical venue, or via a scoreboard image displayed upon a competing player remote electronic device. In the latter instance, a scoreboard image is generated in accordance with an instruction set via processor, or Central Processing Unit CPU, 104 of central system computer 102. Significantly, players participating remotely via an electronic device 130, 132, 134, etc. will receive a visual depiction of the scoreboard communicated to their respective devices, and the scoreboard will be dynamically updated by the processor 104 of the central system computer 102 such that the scoreboard is continuously updated in real time on each player's device display via dynamic transmission over the central system computer network (e.g. including the internet). Accordingly, the visual depiction of the scoreboard 200 upon each player's display will be continually modified following each hand of play.

While the layout/format of scoreboard 200 may change without departing from the intended scope of the invention, particular information displayed upon the scoreboard is a crucial feature of the invention that relies upon the chip stack size resetting feature of the method. The scoreboard 200 preferably includes a continually updated tally of chips won or lost by each player at the conclusion of each hand, as well as a total chip win/loss tally for each player beginning with the commencement of a first hand of play and terminating with the conclusion of a last hand of play. In accordance with the chip size resetting feature of the method, the sum of all chips won/lost by the players once a hand has been played to conclusion will always equal zero.

As depicted in the exemplary scoreboard layout 200, which includes sample data, a series of columns 216, 218, 220, 222 may be used to identify informational data cells pertaining to each player. In this case, the scoreboard 200 contains data for four players following a single orbit (i.e.

following the completion of four hands of play). A first row 202 may include a series of data cells 216, 218, 220, 222 identifying each player's data column (i.e. PLAYER 1; PLAYER 2; PLAYER 3; and PLAYER 4). A second row 204 may include a "WIN/LOSS" header, further identifying each player's data column as containing win/loss information over the course of four hands played to completion. A series of rows 206, 208, 210 and 212 denote win/loss information for each player for each hand played (i.e. HAND 1; HAND 2; HAND 3; and HAND 4). A final column 214 denotes a running tally, or total, win/loss value for each competing player. During the course of playing all four hands, the total win/loss for each player is continuously updated in real time and communicated to the participating players' devices for viewing.

Referring now specifically to the first hand of play (denoted as row 206), in this example PLAYER 1 did not win or lose any of his initial stack during the first hand, PLAYER 2 won 100 units of his initial stack during the first hand, PLAYER 3 lost 20 units of his initial stack during the first hand, and PLAYER 4 lost 80 units of his initial stack during the first hand. It should be noted that the total sum of chip units won/lost by the four players during the first hand of play is equal to zero, which is always the case. Accordingly, prior to commencement of the second hand of play (HAND 2), the total chip units won/lost that would have been displayed along the TOTAL row 214 for PLAYERS 1 through 4 would have indicated 0 units, +100 units, −20 units, and −80 units respectively.

As previously stated herein, a crucial feature of the present invention pertains to the incorporation of chip stack resizing prior to the commencement of any new hand of play. Therefore, prior to the commencement of play for HAND 2 each of the players' chip stack sizes are reset so that each player begins the new hand with the same chip stack size (i.e. the same total chip units). Accordingly, data for the first hand of play is stored in database 120 and processor 104 communicates instructions to reset each player's chip stack size prior to commencing with dealing new cards. As shown in FIG. 3, during the play of HAND 2, PLAYER 1 has lost 50 units, PLAYER 2 has lost 75 units, PLAYER 3 has not won/last any UNITS, and PLAYER 4 has won 125 units.

Following the completion of one complete orbit of play (i.e. four hands played to completion), the players' respective tally of units won/lost is as follows: PLAYER 1 has won 125 units (i.e. 0 units−50 units+75 units+100 units); PLAYER 2 has won 100 units; PLAYER 3 has lost 120 units; and PLAYER 4 has lost 105 units. Accordingly, following completion of a single orbit, the scoreboard 2020 displays the following total "scores" for each of the participating players: Player 1 (+125 units); Player 2 (+100 units); Player 3 (−$120 units); and Player 4 (−105 units).

If we assume for the purpose of illustration, that each of the players in the current example began play with a starting stack size of 1,000 units, then following play of the first hand (i.e. HAND 1): PLAYER 1 has his current chip stack size maintained as the system determines that there has been no gain or loss of chips following HAND 1; for PLAYER 2, 100 units of chips are removed/subtracted by the system from his then-current stack size (i.e. 1,100 units) in order to reset his stack size to 1,000 units; for PLAYER 3, 20 units of chips are added by the system to his then-current stack size (i.e. 980 units) replacing the 20 units of chip value lost during HAND 1; and for PLAYER 4, 80 units of chips are added by the system to his then-current stack size (i.e. 920 units) replacing the 80 units of chip value lost during HAND 1.

Again, the incorporation of a step of resetting individual player chip stack sizes following the completion of each hand of play is a critical feature of the method of the present invention. This unique variation on the conventional poker playing methods enables and supports the deployment of a corresponding skill-based poker "contest," which is a substantial departure from a conventional poker card "game" or "tournament."

Referring now to FIG. 4*a*, the following description sets forth a method for determining a total Equity Quotient (TOTAL EQ) for two players (i.e. PLAYER 1 and PLAYER 2) during each street of a played-out first hand. In this example, the blinds (i.e. Small/Big Blinds) are assumed to be $500/$1000, with an Ante of $500. In this example, PLAYER 1 is holding a pair of Aces as his hole cards (i.e. the Ace of spades & Ace of hearts), and PLAYER 2 is holding a pair of Jacks as his hole cards (i.e. the Jack of diamonds & Jack of clubs). Based upon the players' relative cards and taking into account that they are in a heads-up situation, prior to the flop (i.e. PRE-FLOP) PLAYER 1 has current hand equity of 80.4%, while PLAYER 2 has current hand equity of 19.6%. As used herein, the term "current hand equity" is meant to denote the percentage of the current pot (i.e. 18,500 units) that "belongs to" PLAYER 1. In other words, PLAYER 1 has an 80.4% statistical chance of winning the current pot, while PLAYER 2 has a 19.6% statistical chance of winning the current pot at this juncture of the hand—which is still playing out.

Accordingly, at this PRE-FLOP stage of the hand PLAYER 1 would be considered to have an Equity Quotient (i.e. EQUITY QUOTIENT P1) of +2.11. Here, the Pre-Flop Equity Quotient for PLAYER 1 is calculated as follows (using the equation in paragraph [0041]:

EQ (PRE-FLOP)=(((0.804)−(7,500/18,500))*18,500)/3,500=+2.11

Likewise, the POST-FLOP Equity Quotient for PLAYER 1, based upon a flop of: six of clubs ($6_c$), Jack of spades ($J_s$), and Four of diamonds ($4_d$), or [$6_c$, $J_s$, $4_d$] is:

EQ (FLOP)=(((0.0859)−(10,000/38,500))*38,500)/3,500=−1.91

Likewise, the POST-TURN Equity Quotient for PLAYER 1 is:

EQ (TURN)=(((0.0455)−(82,000/202,500))*202,500)/3,500=−20.8

Since both PLAYER 1 and PLAYER 2 are "all in" following the turn (i.e. all of the chips of both players are already in the pot), no Equity Quotient calculation is made on the River (i.e. since there is no further betting).

Accordingly, the total Equity Quotient for PLAYER 1 for this single played-out hand is equal to the sum of his individual Equity Quotients for each street of the hand. In this case, the total Equity Quotient of PLAYER 1 for this exemplary hand is equal to −20.6 (i.e. 2.11−1.91−20.8). Calculating the Equity Quotient for PLAYER 2 in the same manner results in a corresponding total Equity Quotient for this exemplary hand of +37.92

Referring now to FIG. 4*b*, the following description sets forth the method for determining a total Equity Quotient (EQ) for two players (i.e. PLAYER 1 and PLAYER 2) during each street of a played-out second hand. In this example, the blinds (i.e. Small Blind/Big Blind) are assumed to be 1000/2000 units, with an Ante of 1000 units.

PLAYER 1 is holding [$Q_h 8_h$] as his hole cards (i.e. Queen of hearts & Eight of hearts), and PLAYER 2 is holding [$K_c J_c$] as his hole cards (i.e. the King of clubs & Jack of clubs). Based upon the players' relative cards and taking into account that they are in a heads-up situation, prior to the flop (i.e. PRE-FLOP) PLAYER 1 has a current hand equity of 37.3% (and a corresponding Equity Quotient of 0.085), while PLAYER 2 has a current hand equity of 62.7% (and a corresponding Equity Quotient of 0.630). Similarly, following the flop (i.e. POST-FLOP) PLAYER 1 has hand equity of 47.1% (and corresponding Equity Quotient of 0.93), while PLAYER 2 has hand equity of 52.9% (and corresponding Equity Quotient of 1.21). Continuing with this example, following the turn (i.e. TURN) PLAYER 1 has hand equity of 29.5%, while PLAYER 2 has hand equity of 70.5%. No corresponding Equity Quotients are calculated at the TURN since there is no wagering on this street. On the River, PLAYER 1 has hand equity of 100% (and corresponding Equity Quotient of 8.57), while PLAYER 2 has hand equity of 0% (and corresponding Equity Quotient of −3.86).

In like manner to the initial example of Hand 1 (FIG. 4*a*), in this case, the total Equity Quotient of PLAYER 1 for this second ($2^{nd}$) played-out hand is equal to the sum of his Equity Quotients for each street of the hand. In this case, the total Equity Quotient of PLAYER 1 for this exemplary hand is 9.59 (i.e. 0.085+0.93+8.57). Calculating the Equity Quotient for PLAYER 2 in the same manner results in a corresponding total Equity Quotient for this exemplary hand of −2.02

Significantly, based upon information collected and stored in database 120 and dynamic calculations made by processor 104, each player is assigned a continuously changing respective Average Equity Quotient that is an average of the total Equity Quotient recorded for every recorded hand of each respective player. Thus, as described above an equity quotient (EQ) is derived for each street of a given hand, and then the equity quotients for individual streets of the hand are added together to arrive at a Total Equity Quotient (TOTAL EQ) for the given hand. Furthermore, each participating player is assigned a respective dynamic Average Equity Quotient calculated as an average of each Hand Equity Quotient. Accordingly, each player's Average Equity Quotient is continuously updated by the system 100 to maintain a constantly evolving and changing player ranking. Preferably, the individual components contributing to the Average Equity Quotient used to determine player relative rankings throughout a contest, or event, are preferably weighted, for example, as follows: Uncontested Chips (30%); Equity Quotient (30%); Match Success (30%); and Experience (10%).

Significantly, in a preferred exemplary implementation, the competitive poker-style event may be implemented in a team format, and preferably in the form of a professional poker league (e.g. a World Poker League), as will be described in more detail below. Significantly, it is contemplated that during an implementation of the method of the present invention incorporating a team-based competition format, individual members of each team each compete simultaneously at different tables.

Figure 5:
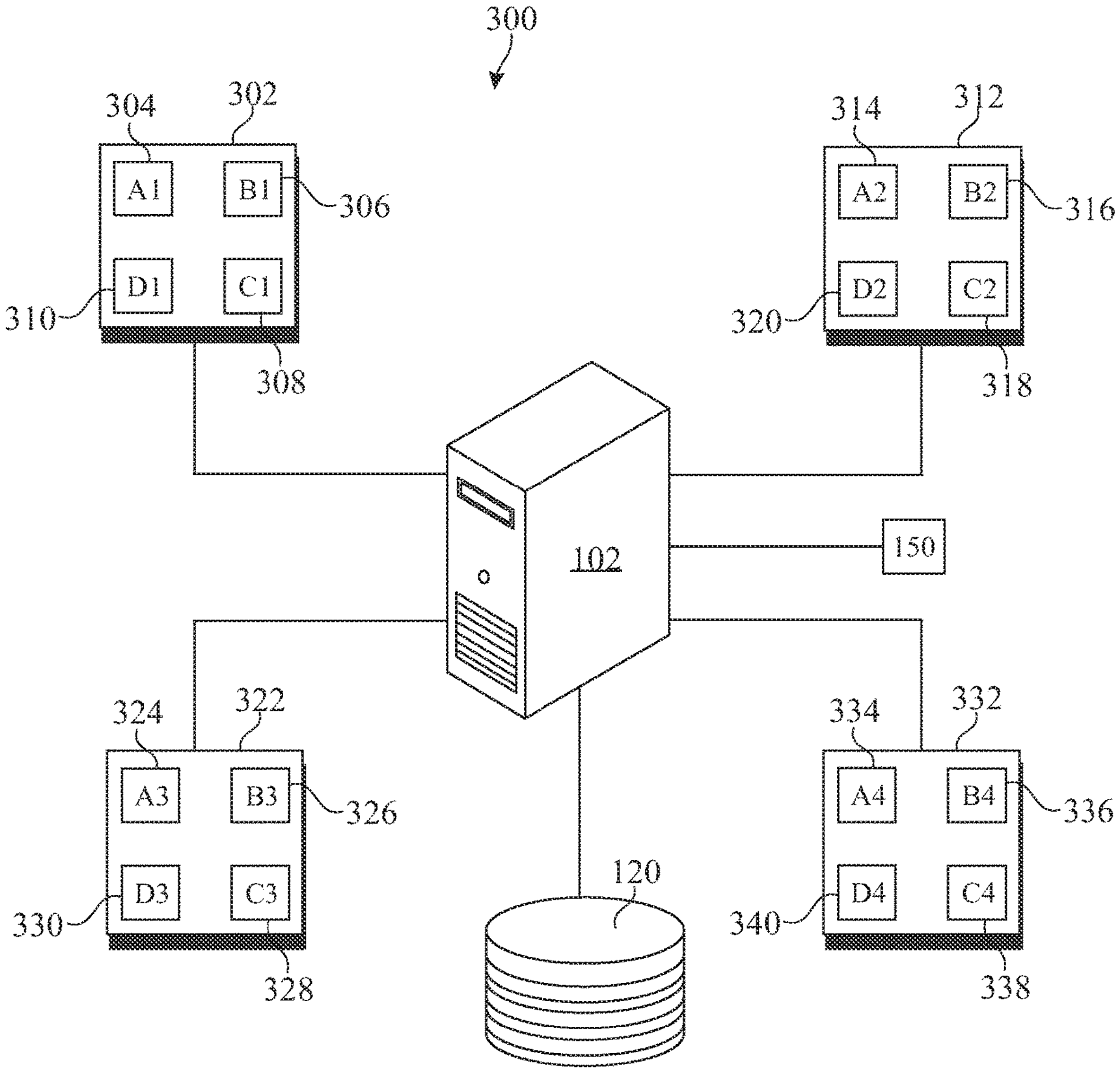
FIG. 5 presents, in block diagram format, a computer network architecture supporting simultaneous play by teams of competitors seated/positioned at a plurality of virtual playing tables, illustrating an exemplary implementation of a poker styled skill-based event supporting a league-based competition eliminating biasing factors and the element of luck associated with conventional poker-based games and tournaments.

Referring now particularly to FIG. 5, a computer-implemented network-based platform 300 for supporting an exemplary team-based league style implementation of the present invention is illustrated in block diagram format. Although the present invention may be implemented with competing individuals seated at actual physical tables within a card playing venue, for the purpose of this example it is assumed that individual members of each team are competing at virtual card tables displayed upon each player's interactive electronic device. In this example, a first team (Team A) is comprised of four team members (A1, A2, A3 and A4); a second team (Team B) is comprised of four team members (B1, B2, B3 and B4); a third team (Team C) is comprised of four team members (C1, C2, C3 and C4); and a fourth team (Team D) is comprised of four team members (D1, D2, D3 and D4).

Significantly, one member from each team is seated at one of four virtual tables. That is, each table includes one player from each team. Furthermore, the players from each team are all at identical seating positions at their respective tables. The importance of this arrangement is described further below. For instance, in this example a first team member from each team (i.e. A1, B1, C1, and D1) is seated at a first table 302. More specifically, player A1 is seated at position 304, player B1 is seated at position 306, player C1 is seated at position 308, and player D1 is seated at position 310 of first table 302. A second team member from each team (i.e. A2, B2, C2, and D2) is seated at a second table 312. More specifically, player A2 is seated at position 314, player B2 is seated at position 316, player C2 is seated at position 318, and player D2 is seated at position 320 of second table 312. A third team member from each team (i.e. A3, B3, C3, and D3) is seated at a third table 322. More specifically, player A3 is seated at position 324, player B3 is seated at position 326, player C3 is seated at position 328, and player D3 is seated at position 330 of third table 322. Finally, a fourth team member from each team (i.e. A4, B4, C4, and D4) is seated at a fourth table 332.

As stated above, the players from each team are all at identical seating positions at their respective tables. For example, player A1 is seated at position 304 of table 302, player A2 is seated at position 314 of table 312, player A3 is seated at position 324 of table 322, and player A4 is seated at position 334 of table 332—where seating positions 304, 314, 324 and 334 are identically located at their corresponding tables 302, 312, 322 and 332. Likewise, players B1, B2, B3 and B4 are seated at respective identically-located seating positions 306, 316, 326 and 336 of their corresponding tables, players C1, C2, C3 and C4 are seated at respective identically-located seating positions 308, 318, 328 and 338 of their corresponding tables, and players D1, D2, D3 and D4 are seated at respective identically-located seating positions 310, 320, 330 and 340 of their corresponding assigned tables.

There are a number of very significant and unique features of this exemplary implementation of the present invention, which lend themselves to supporting a league based poker-style competitive event. The poker-style games played at each table are conducted substantially concurrently. Furthermore, based upon an instruction set, processor 104 effects the electronic transmission (dealing) of identical hole cards to players sharing a common seating position at the respective tables. Thus, for example, the players on Team A (i.e. A1, A2, A3 and A4) seated at respective common seating positions 304, 314, 324 and 334 each receive identical hole cards. For instance, using the game of Texas Holdem as an example, in order to effect a step of dealing an identical pair of hole cards to each of the players (in this case four players) from a particular team (e.g. Team A) processor 104 may randomly generate a first pair of hole cards, deal the first pair of hole cards to a first player (e.g. player A1) and subsequently create replica pairs of those hole cards to deal to the remaining Team A players (i.e. players A2, A3 and A4). In like fashion, a randomly generated pair of hole cards could be generated and communicated to the devices of players on Team B, Team C and Team D from the same randomized virtual playing card deck, which is preferably shuffled from a first playing card order to a second, randomized playing card order, for example, using a random number generator.

Subsequently, during the course of play of a hand, processor 104 could likewise generate a random set of community cards to be displayed at each respective table; that is, such that the community cards and the order in which they are exposed during play is identical at each of the four tables 302, 312, 324 and 334. Thus, where the competition is conducted utilizing a conventional Texas Holdem type format, the initial three community cards (i.e. the flop), the fourth community card (i.e. the turn card), and the fifth community card (i.e. the river card) would be identical upon the devices of each player competing at a common table.

In this manner, the players at each of the four tables would experience an identical situation vis-à-vis the hole cards held by each player and the community cards. Furthermore, since the seating arrangement/positions of the different team members would be identical at all four tables, in effect, the methodology significantly reduces the element of luck that is inherent in any conventional poker-style game with regard to the constant variations in player hand strength. The combination of the chip stack resizing feature (and its application to the method of scoring upon scoreboard 200), along with the application of the aforementioned unique statistical categories (i.e. Uncontested Chips, Equity Quotient and Match Success Rate), creates a unique methodology wherein the elements that are used to calculate/determine relative player rankings are effectively limited to the relative skill levels of competing players.

Accordingly, with regard to a league-style competitive event format the individual players comprising each team are exposed to identical playing situations and the only thing that separates individual and team rankings is the skill of the players while playing out the hands that they are dealt. As will be apparent to any individual skilled in the poker or other competitive card playing arts, the aforementioned platform and competition methodology are a drastic departure from any known conventional competitive poker playing method. In large measure, it is this unique methodology combined with the computer-implemented platform facilitating its implementation that enable the present invention to overcome the long-standing limitations of existing competitive poker-style methodologies that have effectively prevented the development of such a poker-based competitive event capable of determining relative skill levels, and thus relative skill rankings, of players with the degree of accuracy of the present invention.

Referring again to the league-based implementation of the present invention, preferably, each round of competitive play is divided into four quarters of duration (e.g. 10-12 minutes per quarter of play), with the blinds increased following completion of each quarter of play. Additionally, during each played hand a betting clock may be utilized requiring that players act within an accelerated predetermined allotment of time, which is preferably shortened, or reduced, during successive betting streets of a given hand (e.g. an allotment of 15 seconds for each player to act during a round of betting following the flop, 12 seconds on the turn, and 10 seconds on the river). Obviously, the incorporation of a betting clock incrementally decreasing a player's time to act is an optional feature; the invention is not intended to be so limiting. For example, players may be afforded a preset fixed time frame (e.g. 20 seconds) to make a decision as each hand and/or game progresses.

These features are highly significant for a number of reasons. The incorporation of the aforementioned betting clock related features add to the required skill set of participants, since competitors must be able to do any analysis and subsequent decision making within a shortened time frame. Furthermore, such features have the benefit of making each successive hand more significant that the preceding hand, thereby not only increasing the excitement of the participating players, but also increasing the likelihood for an exciting conclusion for those viewing a match. Since the competition is intended to be broadcasted for viewing by the public, for example, via an online (Internet) or television broadcast it is highly beneficial to incorporate such unique features vis-à-vis conventional Texas Holdem game play, which any poker viewing enthusiast will confirm can become tedious to watch when players take an exceedingly long period of time to act.

From a participating player perspective, the present invention incorporates a unique player ranking methodology that is preferably determined based upon three specific variables that are continuously recorded and stored by the central system 100. In particular, as previously referenced and described hereinabove, player rankings are determined based upon: (1) Players' respective Match Success Rates; (2) Players' respective Uncontested Chips Accrued; and (3) Players' respective Average Equity Quotient.

Each participating player is provided with access to a user account maintained on the system, where the player may access a player ranking along with a host of statistical data analyzing various components of the player's competition history. Armed with this information, a participating player may use the data as a tool for analyzing and improving his skill set to improve his corresponding player ranking. Furthermore, with regard to player rankings the system may organize a given league according to player skill level. For instance, top-ranked professional poker players may have an overall ranking (and even a sanctioned World Poker Ranking) that takes into account all participating players, as well as a sub-ranking that only takes into account other participating players grouped into a shared skill level (e.g. Elite Professional Level).

As mentioned hereinabove, the platform of the present invention is configured to enable and facilitate participation by players both online and at an actual physical venue, which could be communicated over a televised broadcast. For players participating from an actual live venue, additional means may be incorporated for tracking individual player statistics (as previously described in great detail hereinabove). For example, any known means for automatically reading poker chips and playing cards could be employed. As an example, the incorporation of casino chips incorporating a radio-frequency identification (RFID) circuit on or within the chip substrate is a known technology that could be utilized (in conjunction with an RF reader configured to read a signal associated with the chip) to track the movement of chips and automatically determine pot sizes, player chip stack sizes, and the like. One example of such technology is disclosed in U.S. Pat. No. 9,477,918 to Stewart, the entire contents of which is incorporated-by-reference herein its entirety. Another example of such technology is disclosed in U.S. Pat. No. 5,651,548 to French et al., the entire contents of which is incorporated-by-reference herein in its entirety. Likewise, with regard to tracking playing cards, examples of such a system and method for the automated tracking of playing cards on a game table are disclosed in U.S. Patent Application Publication No. 2007/0111773 to Gururajan et al. and in Patent Cooperation Treaty (PCT) Application Publication No. WO2008091809 to Miller et al., both of which are incorporated-by-reference herein in their entireties.

While the above description has primarily emphasized event-based and team-based implementations, as will be apparent to those skilled in the art, a significant component of the computer-implemented platform and associated methods disclosed herein is their inherent flexibility, which provides an environment supporting competition by individual players whom are primarily interested in competing against one another strictly to improve their respective rankings. Accordingly, the system platform supports corresponding methods wherein an individual may decide to log in to the corresponding website sporadically for various durations of time. That is, the system is configured to automatically join one or more players only interested in playing a particular user-determined number of hands, etc. while still accounting for the participants' play of those hands in dynamically updating the players' respective rankings.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A computer-implemented method for conducting a poker-based card event amongst a plurality of individual participating players arranged about a virtual card event playing table, comprising steps of:

(a) providing a central computer system network communicative with the internet and including a central system computer server having a processor running a poker competition instruction set, and a database;

(b) providing a plurality of individual participating players each having access to an electronic device in bi-directional communication with said central system computer server, each participating player electronic device having a poker competition mobile software application running thereon, a visual display, and a participating player user interface;

(c) said instruction set creating a virtual poker table having said plurality of participating players assigned thereto, wherein each player is seated at a predetermined position at said virtual table, and wherein each player receives a visual depiction of said table thereon;

(d) assigning an identical chip stack value to each of said participating players prior to commencement of an initial dealt hand of said event, and subsequently displaying a visual depiction of each individual participating player's starting chip stack value upon the corresponding display of each participating player's respective electronic device;

(e) effecting the random shuffle of a virtual deck of playing cards via said computer server processor to alter an order of said playing cards from an initial pre-shuffled playing card order to a randomized post-shuffled playing card order, establishing an initial dealer button position amongst said participating players wherein an individual one of said players seated at the dealer button position is deemed the dealer position, defining a position of a player seated one position to the left of the dealer position as the small blind position, and defining a player seated two positions to the left of the dealer position as the big blind position, and establishing an ante chip unit value, a small blind chip unit value and a big blind chip unit value;

(f) transmitting a portion of each player's starting chip stack equal to said ante chip value to a virtual common game pot displayed upon each player's electronic device, transmitting an additional portion of the chip stack of the player seated in the small blind position to said virtual common game pot equal to said small blind chip unit value, and transmitting an additional portion of the chip stack of the player seated in the big blind position to said virtual common game pot equal to said big blind chip unit value;

(g) commencing the dealing of an initial playing card hand from the post-shuffled virtual playing card deck from the dealer position until each of the participating players has received one or more hole cards only viewable upon that player's electronic device display;

(i) effecting an initial round of betting by said players;

(j) effecting the dealing of at least one exposed community card viewable by each participating player upon his respective electronic device display;

(k) effecting a second round of betting amongst at least two players remaining in said hand;

(l) repeating steps (j) and (k) until a winner of said hand is declared;

(m) determining, for each participating player, a change in the unit value of chips during the play of said hand;

(n) recording said change in unit value of chips for each participating player and storing said recorded information in said database;

(o) resetting, via said instruction set of said processor, each player's total unit value of chips such that each player has an equal chip stack total value; and (p) repeating steps (e) through (o) until the completion of a one or more orbits of play, wherein completion of said orbit of play comprises each participating player playing a hand from said dealer button position;

(q) adding via said processor, for each participating player, a total change in the unit value of chips over the course of said dealt hands, recording said total change in chip unit value within said database, and determining via said instruction set of said processor a relative ranking order of said participating players based upon each player's respective total change in chip unit value, and assigning a point value to said players based upon said determined relative ranking order following completion of each said orbit of play;

(r) repeating steps (e) through (p) until completion of a predetermined quantity of games defining said event; and (s) determining, for each participating player one or more independent variables used to determine relative skill level of said participating players and determining an overall ranking of each of said participating players based upon one or more of said independent variables, wherein the one or more independent variables comprises an Experience value, a Match Success Rate value, an Uncontested Chips Accrued value, and a Total Equity Quotient value, wherein said Experience value further comprises a quantifiable representation of each individual player's degree of exposure to the competitive event format, quantified by measuring the quantity of event matches played, said Match Success Rate value further comprises a quantifiable measure of the average finishing ranking of said participating player at the completion of said event based upon the sum of said point values assigned to said respective players following completion of each said orbit of play, said Uncontested Chips Accrued value further comprises an average units of chips accumulated or lost by said participating player during hands won without being contested by any other participating players, and said Total Equity Quotient value further comprises an average equity that said participating player has gained or lost, in units of chips, per each action made by said participating player over the course of said event.

2. A method for conducting a poker-based card event as recited in claim 1, wherein said step (n) further comprises creating a visual depiction of a virtual scoreboard via said instruction set of said processor, visible upon at least said participating player electronic device displays, for maintaining and displaying, for each participating player, said recorded change in unit value of chips for each dealt hand and/or a determined current total recorded change in unit value of chips during the course of said event.

3. A method for conducting a poker-based card event as recited in claim 2, wherein said step (n) further comprises electronically transmitting to said participating player virtual scoreboards both said recorded change in unit value of chips for each participating player following the completion of each dealt hand and/or said determined total recorded change in unit value of chips during said event.

4. A method for conducting a poker-based card event as recited in claim 1, further comprising a step of broadcasting said event upon at least one of a television network and a computer network.

5. A computer-implemented method for conducting a continuously running competitive poker league wherein multiple teams of poker players compete against one another and are assigned continuously updated team rankings based primarily on statistical variables that directly correlate to skill level of play, as opposed to accumulation of chips, the method comprising steps of:

(a) providing a central computer system network communicative with the internet and including a central system computer server having a processor running a competitive poker event instruction set, and a database;

(b) providing a plurality of individual participating players organized into subsets of teams having an equal number of team players, each participating team player having an electronic device in bi-directional communication with said central system computer server, each participating team player electronic device having poker competition mobile software application running thereon, a visual display, and a participating player user interface;

(c) said instruction set creating a plurality of virtual poker tables equal to the number of players on each team, each virtual poker table having assigned thereto a single individual participating player from each of said teams, wherein each player from each team is seated at a different starting position at the player's respective table, and wherein each player receives a visual depiction of his particular table upon the respective player's electronic device;

(d) assigning an identical chip stack value to each of said participating players prior to commencement of an initial game of said poker competition, and subsequently displaying a visual depiction of each individual participating player's starting chip stack value upon the corresponding display of each participating player's respective electronic device;

(e) effecting the randomized shuffle of a virtual deck of playing cards via said computer server processor to alter an order of said playing cards from an initial pre-shuffled playing card order to a randomized post-shuffled playing card order;

(f) effecting the virtual dealing of an initial set of player hole cards to each participating player from each team, such that each of a series of subsets of players, comprised of one player from each respective team, seated at an identical seat position at a respective one of said virtual tables is dealt identical hole cards, and wherein each player is only able to view the face of the hole cards he has been dealt, with the hole cards of other team players at his virtual table displayed in a face-down position such that the value of the other players hole cards at a player's table are only viewable upon the respective players' devices;

(g) assigning a starting dealer position at each of said virtual tables such that said starting dealer position is identical at each of said tables;

(h) initiating a first round of pre-flop betting, with each player at each respective table communicating an action from his respective electronic device to said central computer system network via interaction with a respective electronic device user interface, where each player action is visually depicted in real time upon the corresponding display of each player's electronic device, said action chosen from the group consisting of folding, checking, calling, betting, and raising;

(i) calculating, for each participating player at each said table, a numerical equity quotient value quantifying an average equity that a player has gained or lost during said first round of pre-flop betting, and storing said numerical equity quotient values in said central system computer network database;

(j) dealing a flop comprising an initial set of community cards, wherein the individual playing cards comprising said flop are communicated to each participating player's electronic device and displayed upon each player's corresponding displayed virtual table in an exposed face-up orientation;

(k) initiating a second round of post-flop betting, with each player at each respective table communicating an action from his respective electronic device to said central computer system network via interaction with a respective electronic device user interface, where each player action is visually depicted in real time upon the corresponding display of each player's electronic device, said action chosen from the group consisting of checking, calling, betting, and raising;

(l) calculating, for each participating player at each said table, a numerical equity quotient value quantifying an average equity that a player has gained or lost during said first round of pre-flop betting, and storing said numerical equity quotient values in said central system computer network database;

(m) dealing at least one additional post-flop community playing card, wherein said at least one additional post-flop dealt community playing card is communicated to each participating player's electronic device and displayed upon each player's corresponding displayed virtual table in an exposed face-up orientation;

(n) initiating an additional round of betting following the dealing of each of said at least one additional post-flop dealt community playing cards, with each player at each respective table still remaining active in a current game communicating an action from his respective electronic device to said central computer system network via interaction with a respective electronic device user interface, where each player action is visually depicted in real time upon the corresponding display of each player's electronic device, said action chosen from the group consisting of checking, calling, betting, and raising;

(o) calculating, for each participating player at each said table, a numerical quotient value quantifying an average equity that a player has gained or lost during each said additional round of betting, and storing said numerical equity quotient values in said central system computer network database;

(p) concurrently playing out said game at each of said tables to a resolution wherein at least one of the players seated at each table is identified as a winner or co-winner of said game;

(q) determining, for each participating player at each table, a final chip stack value at the conclusion of said dealt game, communicating said final chip stack value for each player to said database, calculating each player's change in chip stack value and storing each player's change in chip stack value upon said database;

(r) resetting each participating player's chips stack value such that each player has an equal total chip stack value;

(s) establishing a new dealer position at each of said tables, wherein the new dealer position is located by rotating the dealer position one player position; and (t) repeating steps (h) through (s) until each player at each table has played from the dealer position;

(u) determining, for each participating player and/or each participating team one or more independent variables used to determine relative skill level of said participating players and/or said participating teams and determining an overall ranking of each of said participating players and/or said participating teams based upon one or more of said independent variables, wherein the one or more independent variables comprises an Experience value, a Match Success Rate value, an Uncontested Chips Accrued value, and a Total Equity Quotient value, wherein said Experience value further comprises a quantifiable representation of each individual player's degree of exposure to the competitive event format, quantified by measuring the quantity of event matches played, said Match Success Rate value further comprises a quantifiable measure of the average finishing ranking of said participating player at the completion of said event based upon the sum of said point values assigned to said respective players following completion of each said orbit of play, said Uncontested Chips Accrued value further comprises an average units of chips accumulated or lost by said participating player during hands won without being contested by any other participating players, and said Total Equity Quotient value further comprises an average equity that said participating player has gained or lost, in units of chips, per each bet made by said participating player over the course of said event.

6. The method for conducting a continuously running competitive poker league as recited in claim 5, wherein said step (q) further comprises creating a visual depiction of a virtual scoreboard via said instruction set of said processor, visible upon at least said participating player electronic device displays, for maintaining and displaying, for each participating player and/or each participating team, said recorded change in chip stack value for each dealt hand and/or a determined current total recorded change in identical chip stack value during the course of said event.

7. A method for conducting a poker-based card event as recited in claim 6, wherein said step (q) further comprises electronically transmitting to said virtual scoreboards both said recorded change in unit value of chips for each participating player and/or each participating team following the completion of each dealt hand and/or said determined total recorded change in unit value of chips during said event.

* * * * *